US010366093B2

(12) United States Patent
Gui et al.

(10) Patent No.: US 10,366,093 B2
(45) Date of Patent: Jul. 30, 2019

(54) QUERY RESULT BOTTOM RETRIEVAL METHOD AND APPARATUS

(71) Applicant: Baidu Online Network Technology (Beijing) Co., Ltd., Beijing (CN)

(72) Inventors: Jia Gui, Beijing (CN); Jun Cheng, Beijing (CN); Gaolin Fang, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 337 days.

(21) Appl. No.: 15/281,748

(22) Filed: Sep. 30, 2016

(65) Prior Publication Data
US 2017/0329782 A1    Nov. 16, 2017

(30) Foreign Application Priority Data
May 11, 2016    (CN) .......................... 2016 1 0309835

(51) Int. Cl.
G06F 16/2457    (2019.01)
G06F 16/9535    (2019.01)

(52) U.S. Cl.
CPC .... G06F 16/24578 (2019.01); G06F 16/9535 (2019.01)

(58) Field of Classification Search
CPC ........... G06F 17/3053; G06F 16/24578; G06F 16/9535
See application file for complete search history.

(56) References Cited

U.S. PATENT DOCUMENTS

| 2006/0004721 | A1* | 1/2006 | Bedworth | G06F 17/30327 |
| 2006/0235870 | A1* | 10/2006 | Musgrove | G06F 17/2785 |
| 2008/0059431 | A1* | 3/2008 | Aoki | G06F 17/30622 |
| 2012/0185359 | A1* | 7/2012 | Chen | G06F 17/30424 |
| | | | | 705/26.63 |

(Continued)

FOREIGN PATENT DOCUMENTS

| CN | 104077306 A | 10/2014 |
| CN | 104850531 A | 8/2015 |

Primary Examiner — Cam Y T Truong
(74) Attorney, Agent, or Firm — Lathrop Gage LLP

(57) ABSTRACT

Embodiments of the present invention disclose a query result bottom retrieval method and apparatus. The query result bottom retrieval method includes: acquiring, from a resource library and based on a user input target query, query resources associated with the user input target query; acquiring comparative scoring characteristics of each of the query resources, the comparative scoring characteristics including base relevance characteristics; inputting the comparative scoring characteristics of each of the query resources into a pre-trained rank model, to acquire relevance scoring values corresponding to the query resources and output by the rank model, the rank model being a GBRank model; and ranking the query resources based on the relevance scoring values, and selecting, according to the ranking result, a set number of target resources as a bottom retrieval result corresponding to the target query. The technical solution of the present invention, by using a GBRank rank model, optimizes a traditional query result bottom retrieval method, and enhances relevance between a retrieved target resource and a target query.

17 Claims, 5 Drawing Sheets

(56) References Cited

U.S. PATENT DOCUMENTS

| | | | |
|---|---|---|---|
| 2013/0132401 A1* | 5/2013 | Moon | G06F 17/30864 |
| | | | 707/748 |
| 2014/0337311 A1* | 11/2014 | Ling | G06F 17/30979 |
| | | | 707/710 |
| 2016/0155023 A1* | 6/2016 | Uemura | G06K 9/4614 |
| | | | 382/224 |
| 2017/0004455 A1* | 1/2017 | Tang | G06Q 10/1053 |
| 2017/0068749 A1* | 3/2017 | Francis | G06F 3/0414 |
| 2017/0270122 A1* | 9/2017 | He | G06F 17/30554 |

* cited by examiner

QUERY RESULT BOTTOM RETRIEVAL METHOD AND APPARATUS

CROSS-REFERENCE TO RELATED APPLICATION

This application is related to and claims priority from Chinese Application No. 201610309835.4, filed on May 11, 2016, entitled "QUERY RESULT BOTTOM RETRIEVAL METHOD AND APPARATUS", the entire disclosure of which is hereby incorporated by reference.

TECHNICAL FIELD

Embodiments of the present invention relate to information processing technologies, in particular, to a query result bottom retrieval method and apparatus.

BACKGROUND

The back end of an online retrieval system of a commercial search engine (for example, Baidu, Google, Haosou and other products) is generally divided into two logical sub-modules: a precise ranking module and a resource retrieving module. The resource retrieving module is responsible for retrieving resource subsets related to a query from a resource set (for example, a resource set of a webpage search is a set of webpages, a resource set of an image search is a set of images, and so on), which is crawled by a web crawler and integrated into a database. The precise ranking module is responsible for ranking the resource sub-sets retrieved by the resource retrieving module according to degrees of relevance with the query from high to low, and directly determines the final presentation of the retrieval results to the user. The results retrieved by the resource retrieving module determines the resource sets ranked by the precise ranking module and indirectly affects the result of the precise ranking module. A high degree of relevance of resources retrieved by the resource retrieving module may positively affect the result of the precise ranking module.

The traditional ranking strategy is generally a simple ranking method such as bucket sort, which usually performs ranking based on a small number (typically, 3-5 dimensions) of simple base relevance characteristics (such as text relevance), and the strategy is relatively raw. The prior art has the following disadvantages: first, the traditional ranking method has fewer base relevance characteristics that participate in retrieval and has a relatively poor retrieving effect in long queries; secondly, a bucket sort model requires manually-analyzing an association degree comparison between different base relevance characteristics and resource relevance, and each time a base relevance characteristic is added and comparisons between the base relevance characteristics need to be repeated, so it is not convenient enough to add or reduce base relevance characteristics and the scalability is poor; next, the bucket sort model determines a bucket sequence according to an association degree between the base relevance characteristic and resource relevance, and the more the base relevance characteristics adopted are, the less the influence of the base relevance characteristic ranked behind on resource ranking is; even once the base relevance characteristic ranked front determines a resource relevance degree reversely, the base relevance characteristic ranked behind cannot make correction, and a role of differentiating resources by the base relevance characteristics cannot be played.

SUMMARY

In view of this, embodiments of the present invention provide a query result bottom retrieval method and apparatus, to improve a degree of relevance between a bottom retrieval result and a target query input by a user with a preferred existing target resource bottom retrieval technology.

In a first aspect, the embodiments of the present invention provide a query result bottom retrieval method, including:

acquiring, from a resource library and based on a user input target query, query resources associated with the user input target query;

acquiring comparative scoring characteristics of each of the query resources, the comparative scoring characteristics including base relevance characteristics;

inputting the comparative scoring characteristics of each of the query resources into a pre-trained rank model, to acquire relevance scoring values corresponding to the query resources and output by the rank model, the rank model being a Gradient Boosting Rank (GBRank) model; and ranking the query resources based on the relevance scoring values, and selecting, according to the ranking result, a set number of target resources as a bottom retrieval result corresponding to the target query.

In a second aspect, the embodiments of the present invention further provide a query result bottom retrieval apparatus, including:

a query resource acquisition module configured to, acquire, from a resource library and based on a user input target query, query resources associated with the user input target query;

a comparative scoring characteristic acquisition module configured to acquire comparative scoring characteristics of each of the query resources, the comparative scoring characteristics including base relevance characteristics;

a relevance scoring value output module configured to input the comparative scoring characteristics of each of the query resources into a pre-trained rank model, to acquire relevance scoring values corresponding to the query resources and output by the rank model, the rank model being a GBRank model; and a bottom retrieval result generation module configured to rank the query resources based on the relevance scoring values, and selecting, according to the ranking result, a set number of target resources as a bottom retrieval result corresponding to the target query.

In the process of acquiring the bottom retrieval result, the embodiments of the present invention use a GBRank model to rank resources and learn a relationship between characteristics and relevance scoring from training data by using a machine learning method, which, compared with the problem that the bucket sort model requires manually analyzing association degrees between different characteristics and relevance, saves a lot of manpower and time, and is more convenient and quick. Moreover, the traditional bucket sort model needs to repeat comparisons between the comparative scoring characteristics each time a comparative scoring characteristic is added, while the GBRank model may work completely automatically and only needs to add the newly-added comparative scoring characteristic to the training data and re-train the model. As the comparative scoring characteristics used in the bucket sort model have priorities, when multiple comparative scoring characteristics are adopted, the lower the priority of the comparative scoring characteristic is, the less the influence on the ranking result is, and the role of differentiating resources by the comparative scoring characteristics cannot be played. However, the GBRank model comprehensively considers degrees of differentiation of the characteristics on the resources, which can avoid the above defects of the bucket sort model. Besides, once a characteristic ranked front determines a degree of relevance reversely, other characteristics cannot make correction. The existing query result bottom retrieval technology is optimized, adjustment and optimization are convenient, the flexibility is higher, and the degree of relevance between the target query resource and the target query input by the user may be greatly improved.

DETAILED DESCRIPTION OF PREFERRED EMBODIMENTS

Figure 1:
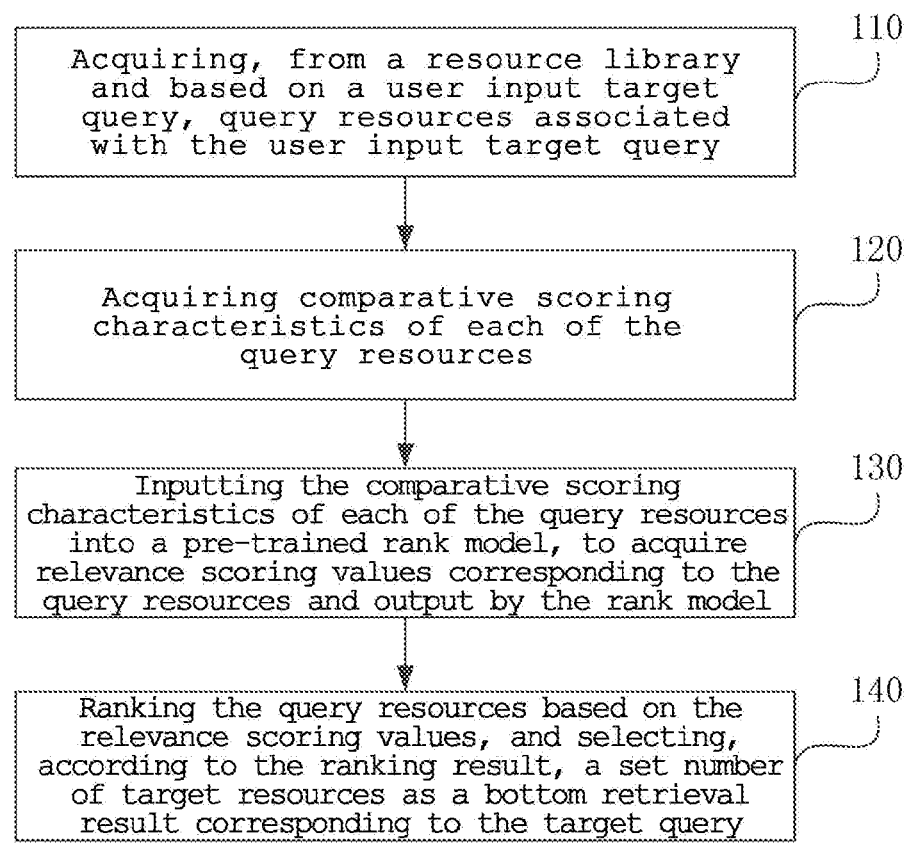
FIG. 1 is a flow chart of a query result bottom retrieval method according to a first embodiment of the present invention.

To make the objectives, technical solutions and advantages of the present invention much clearer, specific embodiments of the present invention are further described below in detail with reference to the accompanying drawings. It may be understood that the specific embodiments described herein are merely used to explain the present invention instead of limiting the present invention.

In addition, it should also be noted that, for ease of description, the drawings only show some of the contents related to the present invention rather than all thereof. Before exemplary embodiments are discussed in more detail, it should be mentioned that some exemplary embodiments are described as processing or methods depicted in flow charts. Although the flow charts describe respective operations (or steps) as sequential processing, lots of operations therein may be implemented in parallel, concurrently or at the same time. In addition, the sequence of the operations may be rearranged. The processing may be terminated when the operations are completed, but additional steps not included in the drawings may also be included. The processing may correspond to a method, a function, a procedure, a subroutine, a subprogram and so on.

First Embodiment

FIG. 1 is a flow chart of a query result bottom retrieval method according to a first embodiment of the present application. The method of this embodiment may be performed by a query result bottom retrieval apparatus, and the apparatus may be implemented in a manner of hardware and/or software and may generally be integrated into a server configured to recall a target query resource related to a target query input by a user. The technical solution provided herein may be applied to all vertical and universal search engine systems through personalized characteristic formulation.

The method of this embodiment specifically includes:

110: Acquiring, from a resource library and based on a user input target query, query resources associated with the user input target query.

In this embodiment, the target query information input by the user carries a search type, wherein the search type may be selected by the user through an option of search types, or, the target query itself carries the search type. Exemplarily, the search type includes webpages, images, news, post bars and the like. For example, the target query is "Beijing Subway Route Map", and the target query carries a search type "Map". Correspondingly, query resources associated with the target query may specifically be a set of webpages, a set of images, a set of videos and other resource sub-sets associated with the query.

120: Acquiring comparative scoring characteristics of each of the query resources, the comparative scoring characteristics including base relevance characteristics.

As stated previously, the technical solution of this embodiment acquires a bottom retrieval result by using a GBRank model to score the query resources and ranking the query resources according to a scoring result, and the GBRank model needs to input one or more characteristics of a query resource to be scored during application and finally generates a scoring value through model calculation.

Correspondingly, in this embodiment, the comparative scoring characteristics specifically refer to characteristics of the query resources, which need to be input to the GBRank model to accomplish the final scoring.

The base relevance characteristics specifically refer to characteristics used to directly measure relevance between the query resources and the target query. Typically, the base relevance characteristics may include a matching degree characteristic of the target query and webpages corresponding to the query resources.

Preferably, in order to further improve and finally improve accuracy of a relevance metric value, the comparative scoring characteristics may further include: quality control characteristics, and/or click characteristics.

Specifically, the quality control characteristics may include: resource classification characteristics, and resource area grading characteristics. Exemplarily, when the query resources are images, the resource classification characteristics may include website classification characteristics corresponding to the images that correspond to the query resources. Further, the website classification characteristics may specifically be a website level score (such as, 80 scores or 90 scores) or a level value (such as, Level A or Level B) determined based on a click rate, an update rate, reliability evaluation and the like of a website. The resource area grading characteristics may be resolutions, sizes and/or pixel values and the like of the images acquired according to attributes of the images.

Exemplarily, the click characteristics include: precise click characteristics and generic click characteristics.

Specifically, the precise click characteristics may be corresponding data of clicking target resources acquired, by analyzing data obtained by monitoring user behaviors, in user behavior data when all users input a current target query. For example, the precise click characteristics may specifically be a ratio of the sum of user click data of current target resources (corresponding to the current target query) to the sum of user presentation data of all target resources of the current target query. For example, images finally clicked by all users that have searched Fan Bingbing and the corresponding total amount of clicks are recorded, statistics is then made on the total amount of presentations of the images, and a ratio of the total amount of clicks of each image to the total amount of clicks corresponding to the total amount of presentations is calculated. For example, the precise click characteristics may be acquired by using a Wilson space method. The total amount of presentations may be acquired from a log for a search engine.

The generic click characteristics may be data of clicking target resources corresponding to corresponding word segmentations acquired, by segmenting the target query to generate a word segmentation set, and then by analyzing data obtained by monitoring user behaviors to obtain, in user behavior data, the respective word segmentations when all users input the current target query. For example, the generic click characteristics may specifically be a ratio of the sum of user click data of current target resources corresponding to a current word segmentation of the current target query to the sum of user click data of all target resources corresponding to all word segmentations of the current target query. For example, the current target query is "Fan Bingbing Wu Meiniang Legend Stills", the number of clicks/presentations corresponding to the four word segmentations are retrieved respectively from an offline generic click dictionary, a word segmentation weight-based weighted sum is calculated, and then a click rate of generic clicks is calculated through weighted sum-based clicks/presentations, For example, the click rate of generic clicks may be calculated by using a Wilson space method. Specifically, a manner of constructing an offline dictionary may specifically be as follows: word-segmenting a precise click query, assigning the number of clicks/presentations of each resource to each word segmentation unit based on a word segmentation weight, to form a quadruple of <term,obj,clc,pv>, that is, a quadruple of <word segmentation, query resource, click on the word segmentation, presentation of the word segmentation>, and then using the word segmentations and the query resources as keywords to combine and add the word segmentations and the query resources having the same keyword. The generic click characteristics are especially suitable for a low frequency query with fewer clicks, can break up click characteristics of a high frequency query onto click characteristics corresponding to the word segmentations, and then map the click characteristics onto the low frequency query.

Preferably, when the generic click characteristics are acquired, it is possible to pre-process the target query previously and only reserve an important word segmentation that affects the relevance between the target query and the query resource as the current word segmentation, for example, it is possible to acquire other remaining word segmentations in the target query as the current word segmentation after function words in the query are removed.

It may be understood that, in an actual application, the base relevance characteristics are relevant to a macro environment of underlying ranking; therefore, the base relevance characteristics may be added according to the actual demands, which is not limited therein. For example, the base relevance characteristics may further include: a basic word quantity-based matching degree, and/or a demand-based matching degree and so on. Specifically, the basic word quantity-based matching degree may be a ratio of the number of basic words of a word segmentation of a hit field to the total number of basic words of the field.

130: Inputting the comparative scoring characteristics of each of the query resources into a pre-trained rank model, to acquire relevance scoring values corresponding to the query resources and output by the rank model, the rank model being a GBRank model.

In this operation, an underlying simple rank model (for example, bucket sort, svm sort and so on) of a general search model is upgraded to a relatively complicated GBRank rank model based on a machine learning method, the comparative scoring characteristics are selected through the GBRank rank model, a relationship between the comparative scoring characteristic and the relevance scoring is learned from training data through the machine learning method, and multi-dimensional comparative scoring characteristics (for example, base relevance characteristics, quality control characteristics, click characteristics and so on) are used to train the model. When it is necessary to add a new characteristic, it is feasible to add the new comparative scoring characteristic to the training data and retrain the model.

The training data of the comparative scoring characteristic may adopt a manner of manual annotation. At first, some queries are extracted randomly from search records of a search engine and submitted to a target search engine, then, first K results returned by the search engine are all selected or extracted at an interval (K is a positive integer), and finally a professional annotates the resources according to degrees of relevance between them and the queries. For example, some queries are selected randomly from a search log, and a data evaluator professionally trained gives a judgment on relevance between the queries and target resources. The following common four-grade scores: poor, average, good, very good, are used as training data.

Corresponding to the search engine, the training data may also be dug from logs, the search engine has a large number of logs which record user behaviors, and the training data may be acquired by a user's clicking the records. Corresponding to search results returned by a query, and the user may click some webpages therein, assuming that the user preferentially clicks a webpage more related to the query. Generally, the user is accustomed to browsing the search results from top to bottom, and if the user skips a webpage ranked behind, a document ranked behind is more related than that ranked front.

140: Ranking the query resources based on the relevance scoring values, and selecting, according to the ranking result, a set number of target resources as a bottom retrieval result corresponding to the target query.

Considering that there are more query resources associated with the target query, a set number of target resources may be selected according to the ranking result as the bottom retrieval result corresponding to the target query. The set number may be set according to an actual situation, which is not limited herein. Specifically, the selecting, according to the ranking result, a set number of target resources as a bottom retrieval result corresponding to the target query may be: selecting, according to the ranking result, a set number of target resources, between which a relevance scoring value of the target query is higher than a certain threshold, as a bottom retrieval result corresponding to the target query. That is, a set number of target resources with a higher degree of relevance are selected as a bottom retrieval result corresponding to the target query.

For example, the user inputs a query "birthday card", the search engine may recall a certain search result based on the query, for example, "website 1-website 5", then it is necessary to input "birthday card" and "website 1-website 5" respectively into the GBRank model as <birthday card, website 1>, <birthday card, website 2> . . . , and the GBRank model may output scores of degrees of relevance between the websites and the "birthday card", and rank website 1-website 5 based on a similarity scoring result.

In the process of acquiring the bottom retrieval result, the embodiment of the present invention uses a GBRank model to rank resources and learn a relationship between characteristics and relevance scoring from training data by using a machine learning method. Compared with the fact that the bucket sort model requires manually analyzing association degrees between different characteristics and relevance, it saves a lot of manpower and time and is more convenient and quick. Moreover, the traditional bucket sort model needs to repeat comparisons between the comparative scoring characteristics each time a comparative scoring characteristic is added, while the GBRank model may work completely automatically and only needs to add the newly-added comparative scoring characteristic to the training data and re-train the model. As the comparative scoring characteristics used in the bucket sort model have priorities, when the multiple comparative scoring characteristics are adopted, the lower the priority of the comparative scoring characteristic is, the less the influence on the ranking result is, and its role of differentiating resources cannot be played well. However, the GBRank model comprehensively considers degrees of differentiation of the characteristics on the resources, which can avoid the above defects of the bucket sort model. Besides, once a characteristic ranked front determines a degree of relevance reversely, other characteristics cannot make correction. The existing query result bottom retrieval technology is optimized, adjustment and optimization therefor are convenient, the flexibility is higher, and the degree of relevance between the target query resource and the target query input by the user may be greatly improved.

Second Embodiment

Figure 2:
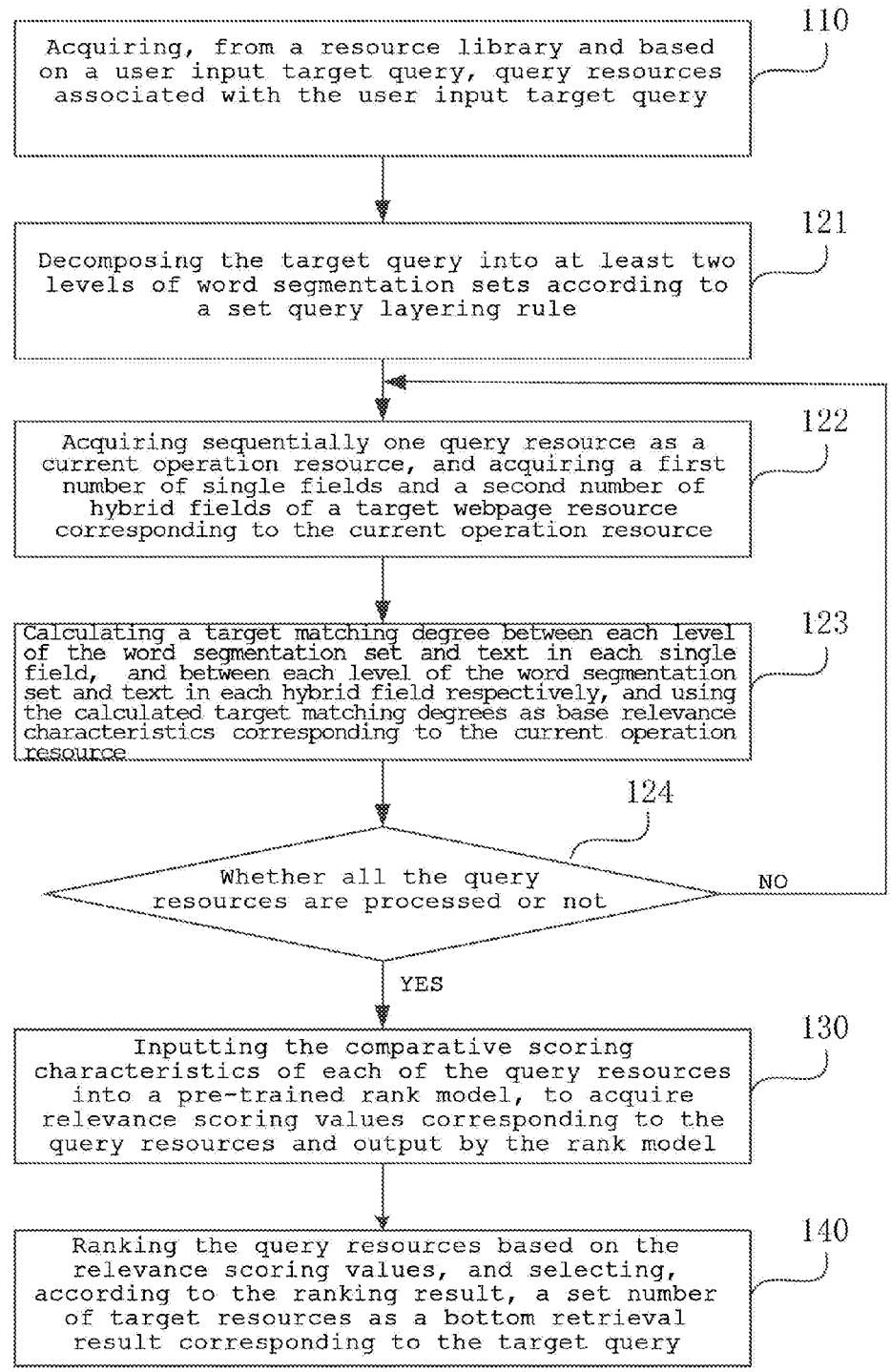
FIG. 2 is a flow chart of a query result bottom retrieval method according to a second embodiment of the present invention.

FIG. 2 is a flow chart of a query result bottom retrieval method according to a second embodiment of the present invention. This embodiment is optimized on the basis of the above embodiment; in this embodiment, each of the base relevance characteristics is specifically optimized to be a matching degree characteristic of the target query and webpages corresponding to the query resources.

Correspondingly, the step of acquiring the base relevance characteristics of the query resources is specifically optimized by: decomposing the target query into at least two levels of word segmentation sets according to a set query layering rule; acquiring sequentially one query resource as a current operation resource, and acquiring a first number of single fields and a second number of hybrid fields of a target webpage resource corresponding to the current operation resource; calculating a target matching degree between each level of word segmentation set and text in each single field as well as text in each hybrid field respectively, and using the calculated target matching degrees as base relevance characteristics corresponding to the current operation resource; and returning to perform the operation of acquiring one query resource as a current operation resource till all the query resources are processed.

Specifically, the method of this embodiment includes:

110: Acquiring, from a resource library and based on a user input target query, query resources associated with the user input target query.

121: Decomposing the target query into at least two levels of word segmentation sets according to a set query layering rule.

In this embodiment, the set query layering rule may be such a rule that adopts an existing word segmentation machine, conducts word segmentation according to a word segmentation rule of the existing word segmentation machine, and then divides a word segmentation into levels according to a basic semantic. Exemplarily, it is possible to decompose the target query into a core layer and a weight adjusting layer according to significance of each word segmentation in the target query after the target query is word-segmented. A word segmentation set of the core layer includes word segmentations that have to be hit, i.e., the word segmentations participating in relevance calculation scoring. Significance of word segmentations in the weight adjusting layer is only secondary to that of the word segmentations in the core layer. Further, a disable layer may also be decomposed from the target query, including words in the target query which do not affect the semantic. It should be noted that word segmentation varies if a different word segmentation machine is used. Generally, decomposition of the target query requires segmenting keywords, removing disabled words and performing other operations on the input target query, and word segmentation may be specifically conducted according to a single word or according to a basic semantic.

In this embodiment, the set query layering rule may also be may be such a rule that pre-processes the query, conducts word segmentation according to meanings or contexts, and then decomposes the target query into at least two levels of word segmentation sets according to the part of speech of each word segmentation. For example, in the word segmentations corresponding to the target query, nominal word segmentations may be classified as a core layer, verbal word segmentations are classified as a weight adjusting layer, and particle word segmentations are classified as a disable layer and so on.

122: Acquiring sequentially one query resource as a current operation resource, and acquiring a first number of single fields and a second number of hybrid fields of a target webpage resource corresponding to the current operation resource.

The acquiring a first number of single fields and a second number of hybrid fields of a target webpage resource corresponding to the current operation resource may further comprises: structurally parsing the target webpage resource according to a set webpage resource parsing rule, to generate a first number of single fields and a second number of hybrid fields. For example, the target webpage resource corresponding to the current operation resource may be parsed, according to webpage contents, as including a heading field, a sub-heading field, a main body field and so on. It should be noted that the structure also varies depending on different webpage contents, and thus "the first number" and "the second number" may be set according to actual demands, which is not limited herein.

In this operation, specifically, it is also possible to acquire single fields of the target webpage resource corresponding to the current operation resource from inverted indexes and then to calculate base relevance characteristics in combination with text attributes (for example, word segmentation lengths, layers and so on) of the word segmentations of the query.

123: Calculating a target matching degree between each level of the word segmentation set and text in each single field, and between each level of the word segmentation set and text in each hybrid field respectively, and using the calculated target matching degrees as base relevance characteristics corresponding to the current operation resource.

In a preferred implementation of this embodiment, the target matching degree may include: a length-based matching degree, and/or a weight-based matching degree. Specifically, the length-based matching degree may be a matching degree calculated according to a ratio of the length of a layer of a hit field to the total length of the field; the weight-based matching degree may be a matching degree calculated according to a ratio of the sum of weights of word segmentations of the hit field to the total weight of the field.

Exemplarily, if 1) six single fields and one hybrid field differentiated after structural parsing by using the target webpage resource, 2) the core layer, the weight adjusting layer, the disable layer and other word segmentation sets decomposed from the query according to significance of the word segmentations, and 3) a length-based matching degree and a weight-based matching degree of a single field text/hybrid field text/query text are added in the base relevance characteristics, the base relevance characteristics have a total of 3*7*2=42 dimensions. Compared with the traditional bottom retrieval method, more base relevance characteristics participating in recall are added, such that the query result corresponding to the long query is more precise.

124: Determining whether all the query resources are processed or not; if yes, performing 130; otherwise, returning to perform 122.

130: Inputting the comparative scoring characteristics of each of the query resources into a pre-trained rank model, to acquire relevance scoring values corresponding to the query resources and output by the rank model, the rank model being a GBRank model.

140: Ranking the query resources based on the relevance scoring values, and selecting, according to the ranking result, a set number of target resources as a bottom retrieval result corresponding to the target query.

According to the technical solution provided in this embodiment, a target query is decomposed into at least two levels of word segmentation sets, and a target matching degree between each level of word segmentation set and text in each single field as well as text in each hybrid field text is calculated respectively as the base relevance characteristic corresponding to the current operation resource. Compared with the fact that the traditional bottom retrieval method only uses base relevance characteristics having 3 to 5 dimensions, the base relevance characteristics used in the technical solution could make a bottom retrieval query result more accurate, and the use of a machine learning method makes higher flexibility.

Third Embodiment

Figure 3:
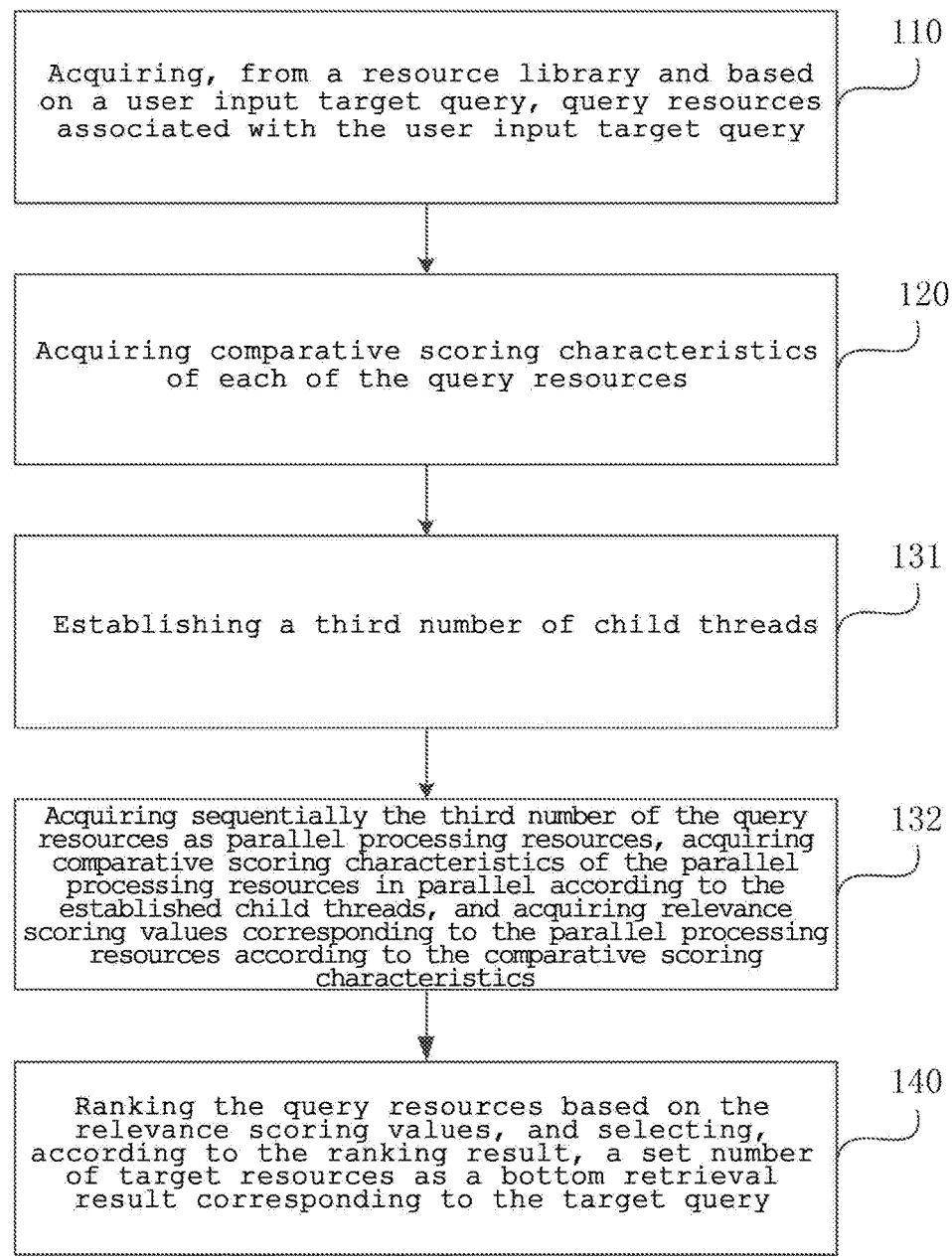
FIG. 3 is a flow chart of a query result bottom retrieval method according to a third embodiment of the present invention.

FIG. 3 is a flow chart of a query result bottom retrieval method according to a third embodiment of the present invention. This embodiment is optimized on the basis of the above embodiments. In this embodiment, the inputting the comparative scoring characteristics of the query resources into a pre-trained rank model, to acquire relevance scoring values corresponding to the query resources output by the rank model is optimized by: acquiring sequentially the third number of the query resources as parallel processing resources, acquiring comparative scoring characteristics of the parallel processing resources in parallel according to the established child threads, and acquiring relevance scoring values corresponding to the parallel processing resources according to the comparative scoring characteristics; wherein operations of acquiring a comparative scoring characteristic of the target parallel processing resource and acquiring the relevance scoring value corresponding to the target parallel processing resource according to the comparative scoring characteristic are performed sequentially in the same thread.

Specifically, the method of this embodiment includes:

110: Acquiring, from a resource library and based on a user input target query, query resources associated with the user input target query.

120: Acquiring comparative scoring characteristics of each of the query resources, the comparative scoring characteristics including base relevance characteristics.

131: Establishing a third number of child threads.

Generally, at least one thread may be created during program startup. At first, the created thread becomes a main thread, and a child thread is usually parallel to other threads of the main thread in order to accomplish a certain task. Considering that there may usually be a great number of query resources related to the target query, in order to save time and improve the efficiency, a parallel processing method may be adopted to establish a third number of child threads. The third number may be any positive integer, and the specific value may be selected according to an actual demand, which is not limited herein. In this embodiment, the third number may be set according to the number of query resources corresponding to the query and/or a preset processing time.

132: Acquiring sequentially the third number of the query resources as parallel processing resources, acquiring comparative scoring characteristics of the parallel processing resources in parallel according to the established child threads, and acquiring relevance scoring values corresponding to the parallel processing resources according to the comparative scoring characteristics; wherein operations of acquiring a comparative scoring characteristic of the target parallel processing resource and acquiring the relevance scoring value corresponding to the target parallel processing resource according to the comparative scoring characteristic are performed sequentially in the same thread.

In this operation, the third number of the query resources are acquired sequentially as parallel processing resources, that is, multiple query resources can be processed at the time. In addition, multiple child threads are established. As a processing procedure of each child thread is independent, according to the established child threads, operations of acquiring a comparative scoring characteristic of the target parallel processing resource and acquiring the relevance scoring value corresponding to the target parallel processing resource are performed sequentially in the same thread, and the multiple query resources do not affect each other and do not need to wait. Therefore, it is possible to acquire comparative scoring characteristics of the parallel processing resources in parallel, and acquire relevance scoring values corresponding to the parallel processing resources and output by the rank model. Preferably, the rank model is a GBRank model.

140: Ranking the query resources based on the relevance scoring values, and selecting, according to the ranking result, a set number of target resources as a bottom retrieval result corresponding to the target query.

According to the technical solution provided in this embodiment, the third number of query resources are acquired sequentially as parallel processing resources. According to the established child threads, comparative scoring characteristics of the parallel processing resources are acquired in parallel, and relevance scoring values corresponding to the parallel processing resources are acquired. Then, the query resources are ranked according to the relevance scoring values, and a set number of target resources are selected according to the ranking result as a bottom retrieval result corresponding to the target query. As the GBRank model is only related to comparative scoring characteristics of a target query resource to be calculated during comparative scoring, relevance scoring values corresponding to the query resources can be calculated in parallel by using multiple threads, and finally the query resources are ranked, which saves a lot of operation time, and improves the efficiency of bottom retrieval of the query result and optimizes the retrieving performance while ensuring the precision.

Fourth Embodiment

Figure 4:
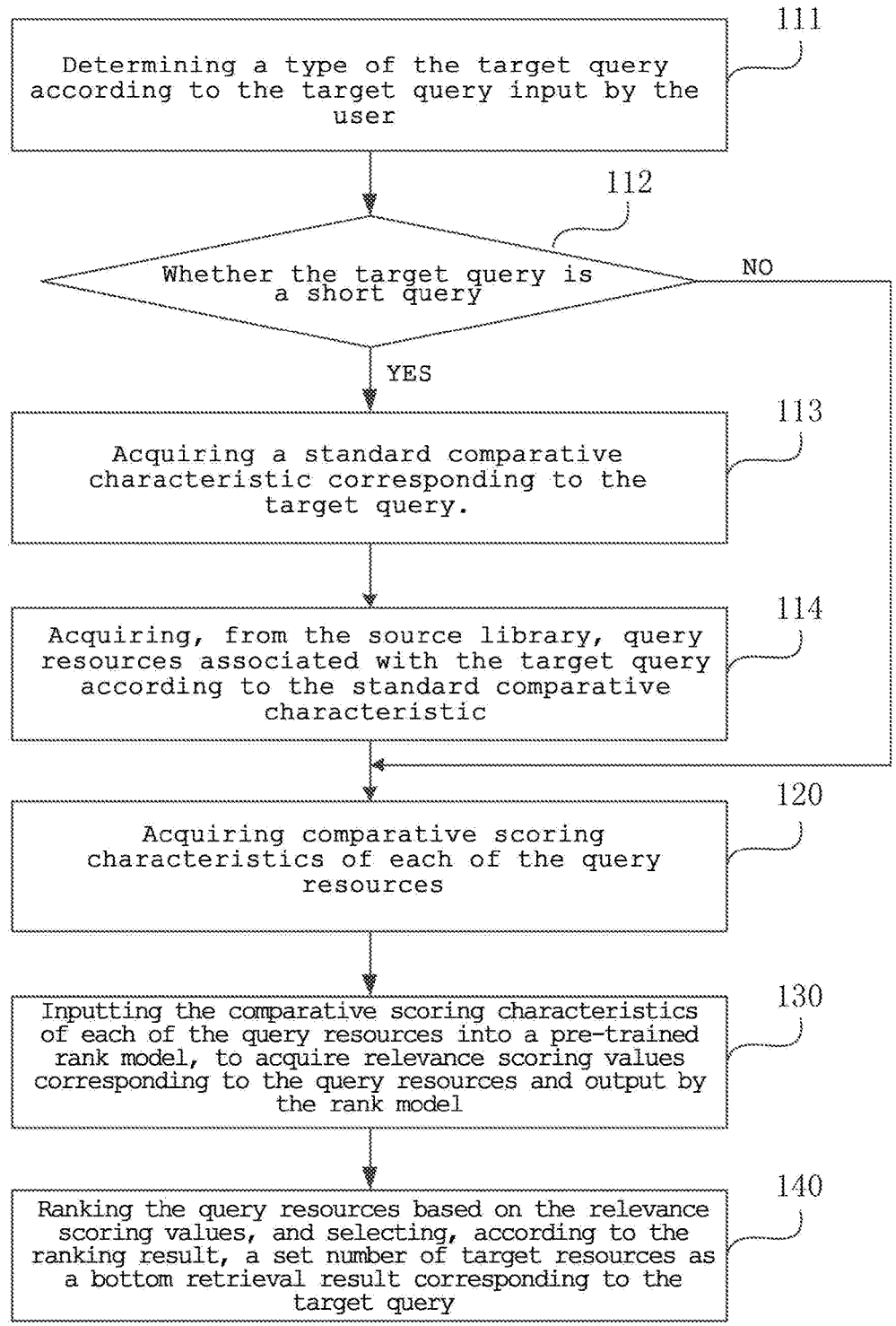
FIG. 4 is a flow chart of a query result bottom retrieval method according to a fourth embodiment of the present invention.

FIG. 4 is a flow chart of a query result bottom retrieval method according to a fourth embodiment of the present invention.

This embodiment is optimized on the basis of the above embodiments. In this embodiment, the acquiring, from a resource library and based on a user input target query, query resources associated with the user input target query is optimized by: determining a type of the target query; acquiring a standard comparative characteristic corresponding to the target query if the target query is a short query; and acquiring, from a source library, query resources associated with the target query according to the standard comparative characteristic.

Specifically, the method of this embodiment includes:

111: Determining a type of the target query according to the target query input by the user.

In this embodiment, the target query input by the user may include two types: a long query and a short query, wherein "long" and "short" may be determined according to a preset query judgment rule. For example, the judgment may be made according to a character length of the query, and the number of word segmentations in the query and so on.

112: Determining whether the target query is a short query or not, if yes, performing 113; and otherwise, performing 120.

A cutoff method may comprise: selecting the most accurate one-dimension base relevance characteristic, and taking out top N query resources with the maximum characteristic value; herein, N may be set to be greater, for example, at a level of one million.

113: Acquiring a standard comparative characteristic corresponding to the target query.

Specifically, the most accurate base relevance characteristic having at least one dimension corresponding to the target query may be selected as the standard comparative characteristic, for example, a text relevance characteristic extracted according to a clustered meaning and the like.

114: Acquiring, from the source library, query resources associated with the target query according to the standard comparative characteristic.

With respect to the short target query, as the number of all the query resources acquired according to the standard comparative characteristic is large, the query resources associated with the target query which are acquired from the resource library may be cut off in advance, such that first N query resources with the maximum standard comparative characteristic value are taken out. In order to ensure accuracy of the retrieved resources, N may be set to be greater, for example, at a level of one million.

120: Acquiring comparative scoring characteristics of each of the query resources, the comparative scoring characteristics including base relevance characteristics.

130: Inputting the comparative scoring characteristics of each of the query resources into a pre-trained rank model, to acquire relevance scoring values corresponding to the query resources and output by the rank model, the rank model being a GBRank model.

140: Ranking the query resources based on the relevance scoring values, and selecting, according to the ranking result, a set number of target resources as a bottom retrieval result corresponding to the target query.

The technical solution provided in this embodiment can solve the problem that an insufficient number of precise resources corresponding to the long query are retrieved. In addition, considering the problem that the number of target query resources to be ranked for the short target query is much greater than that of the target query resources corresponding to the long target query and considering the inaccurate calculation of base relevance rarely occurs in the short target query, the technical solution, when determining that the target query is a short query, acquires a standard comparative characteristic corresponding to the target query, and acquires, from the source library, query resources associated with the target query according to the standard comparative characteristic. That is, the short query may be cut off in advance by using a certain base relevance characteristic calculated most accurately, which further improves the efficiency of bottom retrieval of the query result and optimizes the retrieving performance while ensuring the precision.

A retrieval system may generally have multiple ranking modules. Generally, the underlying ranking is simple, while the upper ranking is complicated. On the basis of the above embodiments, after ranking the query resources based on the relevance scoring values, and selecting, according to the ranking result, a set number of target resources as a bottom retrieval result corresponding to the target query, the method preferably further includes: sending the bottom retrieval result to an upper precise rank model, such that the upper precise rank model ranks the target resources according to the bottom retrieval result, and feeding back the ranking result of the target resources to the user; wherein the upper precise rank model is a GBRank model. By use of the technical solution, bottom retrieval of the target resources is implemented by using a GBRank model, which ensures precision of the bottom retrieval result, and then an upper precise rank model is adopted to rank the target resources corresponding to the bottom retrieval result. As the high precision of the bottom retrieval result lays a good foundation for the precision of the upper precise ranking, the relevance between the target resources and the query input by the user is improved greatly.

Further, in order to significantly reduce consumption of a central processing unit and at the same time, maintain precision of the bottom retrieval result and reduce the response time, preferably, the number of trees of the bottom retrieval rank model is less than that of trees of the upper precise rank model. It may be understood that "bottom" and "upper" are used with respect to a sequence of data processing, for differentiating operations performed by rank models in different application scenarios, which makes expressions of the rank models much clearer instead of limiting the rank models.

Fifth Embodiment

Figure 5:
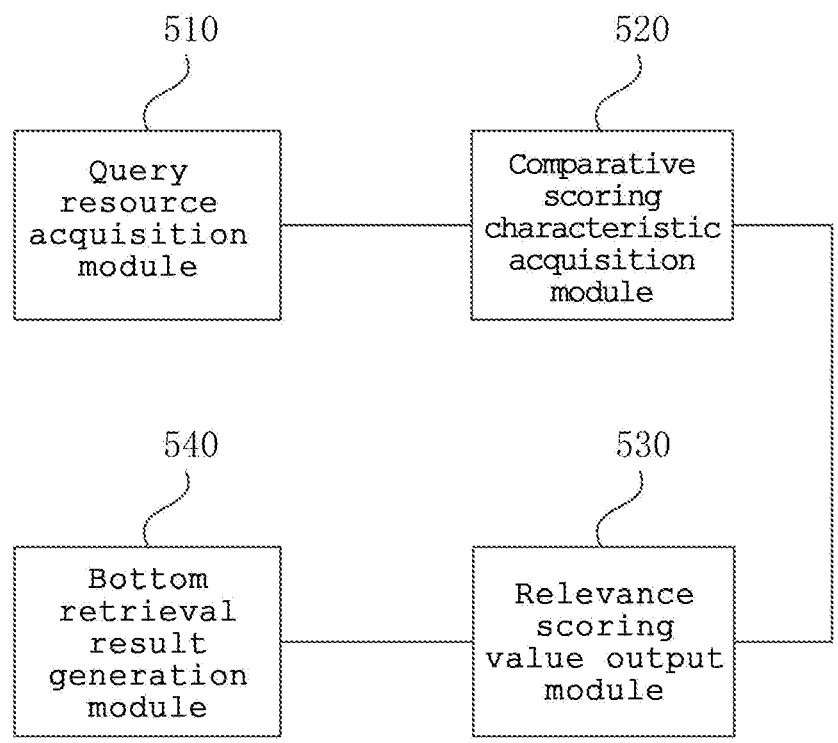
FIG. 5 is a structural diagram of a query result bottom retrieval apparatus according to the fifth embodiment of the present invention.

FIG. 5 is a structural diagram of a query result bottom retrieval apparatus according to a fifth embodiment of the present invention. As shown in FIG. 5, the apparatus includes a query resource acquisition module 510, a comparative scoring characteristic acquisition module 520, a relevance scoring value output module 530 and a bottom retrieval result generation module 540.

The query resource acquisition module 510 is configured to acquire, from a resource library and based on a user input target query, query resources associated with the user input target query.

The comparative scoring characteristic acquisition module 520 is configured to acquire comparative scoring characteristics of each of the query resources, and the comparative scoring characteristics include base relevance characteristics.

The relevance scoring value output module 530 is configured to input the comparative scoring characteristics of each of the query resources into a pre-trained rank model, to acquire relevance scoring values corresponding to the query resources and output by the rank model, and the rank model is a GBRank model.

The bottom retrieval result generation module 540 is configured to rank the query resources based on the relevance scoring values, and selecting, according to the ranking result, a set number of target resources as a bottom retrieval result corresponding to the target query.

In the process of acquiring the bottom retrieval result, the embodiment of the present invention uses a GBRank model to rank resources and learn a relationship between characteristics and relevance scoring from training data by using a machine learning method, which, compared with the fact that the bucket sort model requires manually analyzing association degrees between different characteristics and relevance, saves a lot of manpower and time, and is more convenient and quick. Moreover, the traditional bucket sort model needs to repeat comparisons between the comparative scoring characteristics each time a comparative scoring characteristic is added, while the GBRank model may work completely automatically and only needs to add the newly-added comparative scoring characteristic to the training data and re-train the model. As the comparative scoring characteristics used in the bucket sort model have priorities, when multiple comparative scoring characteristics are adopted, the lower the priority of the comparative scoring characteristic is, the less the influence on the ranking result is, and the role of differentiating resources by the comparative scoring characteristics cannot be played. However, the GBRank model comprehensively considers degrees of differentiation of the characteristics on the resources, which can avoid the above defects of the bucket sort model. Besides, once a characteristic ranked front determines a degree of relevance reversely, other characteristics cannot make correction. The existing query result bottom retrieval technology is then optimized, the adjustment and optimization are convenient, the flexibility is higher, and the degree of relevance between the target query resource and the target query input by the user may be greatly improved.

On the basis of the above embodiment, the comparative scoring characteristics may further include: quality control characteristics, and/or click characteristics.

On the basis of the above embodiments, the quality control characteristics may include: resource classification characteristics, and resource area grading characteristics.

On the basis of the above embodiments, the click characteristics may further include: precise click characteristics, and generic click characteristics.

On the basis of the above embodiments, the base relevance characteristics include: a matching degree characteristic of the target query and webpages corresponding to the query resources. The comparative scoring characteristic acquisition module is further configured to: decompose the target query into at least two levels of word segmentation sets according to a set query layering rule; acquire sequentially one query resource as a current operation resource, and acquire a first number of single fields and a second number of hybrid fields of a target webpage resource corresponding to the current operation resource; calculate a target matching degree between each level of the word segmentation set and text in each single field, and between each level of the word segmentation set and text in each hybrid field respectively, and use the calculated target matching degrees as base relevance characteristics corresponding to the current operation resource; and return to perform the operation of acquiring one query resource as a current operation resource till all the query resources are processed.

On the basis of the above embodiments, the target matching degree may include: a length-based matching degree, and/or a weight-based matching degree.

On the basis of the above embodiments, the base relevance characteristic may further include: a basic word quantity-based matching degree, and/or a demand-based matching degree.

On the basis of the above embodiments, the relevance scoring value output module may be further configured to: acquire sequentially the third number of the query resources as parallel processing resources, acquire comparative scoring characteristics of the parallel processing resources in parallel according to the established child threads, and acquire relevance scoring values corresponding to the parallel processing resources according to the comparative scoring characteristics; wherein operations of acquiring a comparative scoring characteristic of the target parallel processing resource and acquiring the relevance scoring value corresponding to the target parallel processing resource according to the comparative scoring characteristic are performed sequentially in the same thread.

On the basis of the above embodiments, the query resource acquisition module is further configured to: determine a type of the target query; acquire a standard comparative characteristic corresponding to the target query if the target query is a short query; and acquire, from a source library, query resources associated with the target query according to the standard comparative characteristic.

The query result bottom retrieval apparatus provided in the embodiment of the present invention may be configured to perform the query result bottom retrieval method provided in the embodiment of the present invention, which has the corresponding functional modules and achieves the same beneficial effects.

It is apparent that persons skilled in the art should understand that the above modules or steps in the present invention may be implemented through the server as stated above. Alternatively, the embodiments of the present invention may be implemented by a program that can be executed by a computer device, so that they can be stored in a storage device and executed by a processor. The program may be stored in a computer readable storage medium. The storage medium mentioned above may be a read only memory, a magnetic disk, an optical disk or the like. As an option, they may be made into respective integrated circuit modules, or multiple modules or steps in them are made into a single integrated circuit module for implementation. In this way, the present invention is not limited to any specific combination of hardware and software.

The above descriptions are merely preferred embodiments of the present invention, but are not used to limit the present invention. For persons skilled in the art, the present invention may have various modifications and changes. Any modification, equivalent replacement, improvement and the like made within the spirit and principle of the present invention should all be included in the protection scope of the present invention.

What is claimed is:

1. A query result bottom retrieval method, comprising:
   acquiring, by a computer, from a resource library in a memory and based on a user input target query, query resources associated with the user input target query;
   acquiring, by the computer, sequentially one query resource of the query resources as a current operation resource;
   returning, by the computer, to perform an operation of acquiring a next query resource as a current operation resource until all the query resources are processed;
   acquiring, by the computer, comparative scoring characteristics of each query resource of the query resources, the comparative scoring characteristics including base relevance characteristics;
   inputting, by the computer after all the query resources are processed, the comparative scoring characteristics of said each query resource of the query resources into a pre-trained rank model, to acquire relevance scoring values corresponding to the query resources and output a ranking result by the pre-trained rank model, the pre-trained rank model being a Gradient Boosting Rank model;
   ranking, by the computer, the query resources based on the relevance scoring values, and selecting, according to the ranking result, a set number of target resources as a bottom retrieval result corresponding to the user input target query;
   sending, by the computer, the bottom retrieval result to an upper precise rank model such that the upper precise rank model ranks the target resources according to the bottom retrieval result,
   wherein the inputting comprises:
   establishing a third number of child threads; and
   acquiring sequentially a third number of the query resources as parallel processing resources, acquiring comparative scoring characteristics of the parallel processing resources in parallel according to the established child threads, and acquiring relevance scoring values corresponding to the parallel processing resources according to the comparative scoring characteristics of the parallel processing resources;
   wherein operations of acquiring a comparative scoring characteristic of a target parallel processing resource and acquiring a relevance scoring value corresponding to the target parallel processing resource according to the comparative scoring characteristic are performed sequentially in a same thread.

2. The method according to claim 1, wherein the comparative scoring characteristics further comprise: quality control characteristics, or click characteristics.

3. The method according to claim 2, wherein the quality control characteristics comprise: resource classification characteristics, and resource area grading characteristics.

4. The method according to claim 2, wherein the click characteristics comprise: precise click characteristics, and generic click characteristics.

5. The method according to claim 1, wherein the base relevance characteristics comprise matching degree characteristics of the user input target query and webpages corresponding to the query resources; and the base relevance characteristics of the query resources are acquired by:
   decomposing the user input target query into at least two levels of word segmentation sets according to a set query layering rule;
   acquiring sequentially one query resource as a current operation resource, and acquiring a first number of single fields and a second number of hybrid fields of a target webpage resource corresponding to the current operation resource; and
   calculating a target matching degree between each level of the word segmentation sets and text in each single field, and between each level of the word segmentation sets and text in each hybrid field respectively, and using the calculated target matching degrees as base relevance characteristics corresponding to the current operation resource.

6. The method according to claim 5, wherein the target matching degree comprises: a length-based matching degree, or a weight-based matching degree.

7. The method according to claim 5, wherein a base relevance characteristic further comprises: a basic word quantity-based matching degree, or a demand-based matching degree.

8. The method according to claim 1, wherein the acquiring, from a resource library and based on the user input target query, the query resources associated with the user input target query further comprises:
   determining a type of the user input target query;
   acquiring a standard comparative characteristic corresponding to the user input target query if the user input target query is a short query; and
   acquiring, from the source library, query resources associated with the user input target query according to the standard comparative characteristic.

9. A query result bottom retrieval apparatus, comprising:
   at least one processor; and
   a memory storing instructions, which when executed by the at least one processor, cause the at least one processor to perform operations, the operations comprising:
   acquiring, by a computer, from a resource library in the memory and based on a user input target query, query resources associated with the user input target query;
   acquiring, by the computer, sequentially one query resource of the query resources as a current operation resource;
   returning, by the computer, to perform an operation of acquiring a next query resource as a current operation resource until all the query resources are processed;
   acquiring, by the computer, comparative scoring characteristics of each query resource of the query resources, the comparative scoring characteristics including base relevance characteristics;
   inputting, by the computer after all the query resource are processed, the comparative scoring characteristics of said each query resource of the query resources into a pre-trained rank model, to acquire relevance scoring values corresponding to the query resources and output a ranking result by the pre-trained rank model, the pre-trained rank model being a Gradient Boosting Rank model;
   ranking, by the computer, the query resources based on the relevance scoring values, and selecting, according to the ranking result, a set number of target resources as a bottom retrieval result corresponding to the user input target query, and sending, by the computer, the bottom retrieval result to an upper precise rank model such that the upper precise rank model ranks the target resources according to the bottom retrieval result, wherein the inputting comprises:

establishing a third number of child threads; and acquiring sequentially a third number of the query resources as parallel processing resources, acquiring comparative scoring characteristics of the parallel processing resources in parallel according to the established child threads, and acquiring relevance scoring values corresponding to the parallel processing resources according to the comparative scoring characteristics of the parallel processing resources;

wherein operations of acquiring a comparative scoring characteristic of a target parallel processing resource and acquiring a relevance scoring value corresponding to the target parallel processing resource according to the comparative scoring characteristic are performed sequentially in a same thread.

10. The apparatus according to claim 9, wherein the comparative scoring characteristics further comprise: quality control characteristics, or click characteristics.

11. The apparatus according to claim 10, wherein the quality control characteristics comprise: resource classification characteristics, and resource area grading characteristics.

12. The apparatus according to claim 10, wherein the click characteristics comprise: precise click characteristics, and generic click characteristics.

13. The apparatus according to claim 9, wherein the base relevance characteristics comprise matching degree characteristics of the user input target query and webpages corresponding to the query resources; and the base relevance characteristics of the query resources are acquired by:

decomposing the user input target query into at least two levels of word segmentation sets according to a set query layering rule;

acquiring sequentially one query resource as a current operation resource, and acquiring a first number of single fields and a second number of hybrid fields of a target webpage resource corresponding to the current operation resource; and calculating a target matching degree between each level of the word segmentation sets and text in each single field, and between each level of the word segmentation sets and text in each hybrid field respectively, and using the calculated target matching degrees as base relevance characteristics corresponding to the current operation resource.

14. The apparatus according to claim 13, wherein the target matching degree comprises: a length-based matching degree, or a weight-based matching degree.

15. The apparatus according to claim 13, wherein the base relevance characteristic further comprises: a basic word quantity-based matching degree, or a demand-based matching degree.

16. The apparatus according to claim 9, wherein the acquiring, from a resource library and based on the user input target query, query resources associated with the user input target query further comprises:

determining a type of the user input target query;

acquiring a standard comparative characteristic corresponding to the user input target query if the user input target query is a short query; and acquiring, from the source library, query resources associated with the user input target query according to the standard comparative characteristic.

17. A non-transitory storage medium storing one or more programs, the one or more programs when executed by an apparatus, causing the apparatus to perform a query result bottom retrieval method, comprising:

acquiring, by a computer, from a resource library in a memory and based on a user input target query, query resources associated with the user input target query;

acquiring, by the computer, sequentially one query resource of the query resources as a current operation resource;

returning, by the computer, to perform an operation of acquiring a next query resource as a current operation resource until all the query resources are processed;

acquiring, by the computer, comparative scoring characteristics of each query resource of the query resources, the comparative scoring characteristics including base relevance characteristics;

inputting, by the computer after all the query resource are processed, the comparative scoring characteristics of said each query resource of the query resources into a pre-trained rank model, to acquire relevance scoring values corresponding to the query resources and output a ranking result by the pre-trained rank model, the pre-trained rank model being a Gradient Boosting Rank model;

ranking, by the computer, the query resources based on the relevance scoring values, and selecting, according to the ranking result, a set number of target resources as a bottom retrieval result corresponding to the user input target query; and sending, by the computer, the bottom retrieval result to an upper precise rank model such that the upper precise rank model ranks the target resources according to the bottom retrieval result, wherein the inputting comprises:

establishing a third number of child threads; and acquiring sequentially a third number of the query resources as parallel processing acquiring sequentially a third number of the query resources as parallel processing resources, acquiring comparative scoring characteristics of the parallel processing resources in parallel according to the established child threads, and acquiring relevance scoring values corresponding to the parallel processing resources according to the comparative scoring characteristics of the parallel processing resources;

wherein operations of acquiring a comparative scoring characteristic of a target parallel processing resource and acquiring a relevance scoring value corresponding to the target parallel processing resource according to the comparative scoring characteristic are performed sequentially in a same thread.

* * * * *